C. D. MACROPOULOS.
TIRE.
APPLICATION FILED DEC. 19, 1919.

1,348,954.

Patented Aug. 10, 1920.

Inventor
Constantine D. Macropoulos
By his Attorneys
Redding & Greeley

UNITED STATES PATENT OFFICE.

CONSTANTINE D. MACROPOULOS, OF NEW YORK, N. Y.

TIRE.

1,348,954.

Specification of Letters Patent. Patented Aug. 10, 1920.

Application filed December 19, 1919. Serial No. 345,973.

*To all whom it may concern:*

Be it known that I, CONSTANTINE D. MACROPOULOS, a citizen of the United States, residing in the borough of Manhattan of the city of New York, in the State of New York, have invented certain new and useful Improvements in Tires, of which the following is a specification, reference being had to the accompanying drawing, forming a part hereof.

This invention relates to tires adapted for use with motor vehicles and particularly with motor trucks in which the tires are usually solid. It has for its principal object to provide a tire which is made up of a plurality of units of simple construction which may be readily assembled on the felly and which give a degree of resiliency heretofore unobtainable with solid tires. More particularly, the invention seeks to associate with a solid tire auxiliary cushioning devices which may be readily and securely locked in position and which, in use, add greatly to the resiliency of the tire. In accordance with the invention there is provided a felly for a wheel which is of such construction as to receive the auxiliary cushioning devices and support them in most advantageous relation to the rim on which the solid tire is carried. Associated with the improved felly and cushioning devices are detachable flanges for maintaining the felly, the cushioning devices and tire in proper relation to one another and hold the solid tire against creeping.

The invention will be described with greater particularity hereinafter in connection with the illustrated embodiment shown in the drawing and in which drawing—

The wheel $a$ which may be of any approved construction carries thereon, either fixedly or removably, a felly $b$, the periphery of which is formed with transverse depressions $b'$ to receive cushioning blocks $c$ which, in the preferred form, are of cylindrical form and are two in number for each depression. On the felly $b$ is carried a rim $d$ which is preferably made up as a relatively flexible band adapted to support a solid tire $e$ which may be of one piece or of several segments. In the illustrated embodiment, this tire is shown as made up of several segments $e'$. The rim $d$, cushioning blocks $c$ and tire $e$ are held in proper relation on the felly $b$ by means of circumferential plates $f$, $g$, one or both of which may be formed as segments. The plates $f$, $g$ are secured in position to the felly $b$ by means of through-bolts $h$. The rim $d$ may be held in proper position on the felly $b$ by means of screws $i$ which pass through slots $d'$ formed in the rim and engage the felly. The width of these slots $d'$ may be such as to just receive the screw $i$, while their length circumferentially is such as to permit flexing of the band $d$ in one direction or the other. The heads $i'$ of the screws may be placed slightly above the periphery of the band $d$ and effectually limit its outer movement away from the felly. The tire $e$ or the section $e'$ thereof may be recessed, as indicated at $e^2$, to receive the screw heads $i'$. While the recesses $e^2$ are shown on an enlarged scale it is to be understood that the screw heads $i'$ will fit so snugly therein as not to permit any appreciable movement between the tire body and the heads of the screws under load.

Figure 1:
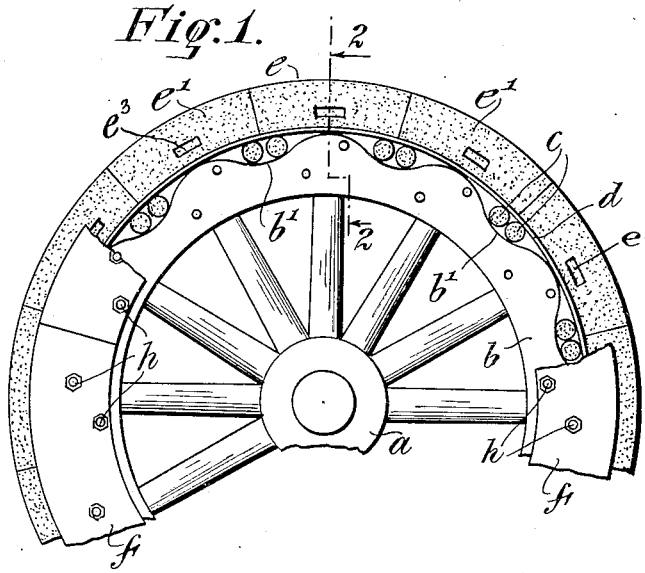
Figure 1 is a view in elevation of a fragment of a wheel equipped with the improved tire, part of the retaining flange being broken away.
Figure 2:
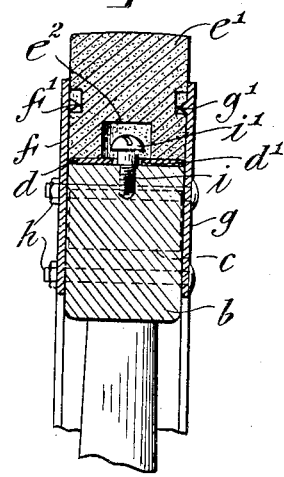
Fig. 2 is a view in transverse section, taken on the planes indicated by the broken lines 2—2 of Fig. 1 and looking in the direction of the arrows.
Figure 3:
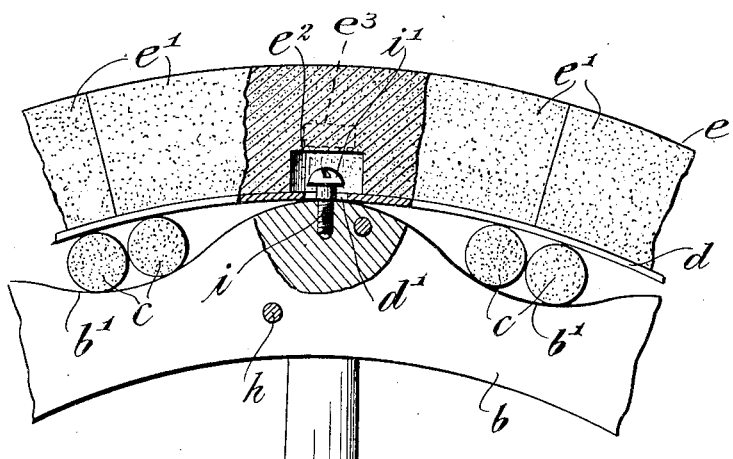
Fig. 3 is a detail view partly in elevation and partly in section showing the relation between the felly, the cushioning devices, the rim and the solid tire.

In assembling the improved tire when the tire body $e$ is of one piece it will first be slipped on to the rim $d$. When it is made up of a series of segments $e'$, as illustrated, these segments may be placed in position, one at a time, after the rim $d$ has been slipped on to the felly $b$. In either case, it is intended that the first operation consist in slipping the rim $d$ on to the felly $b$. The cushions $c$ are then pushed in the depressions $b'$ and crowded between the rim $d$ and the felly. The size of these cushions is such as effectively to span the distance between the band $d$ and their point of engagement with the felly $b$. The length of the cushions $c$ is about equal to or perhaps a little less than the width of the felly $b$, and the rim bears the same relation to the felly and to the cushions. When the tire $e$ is made in one piece it is placed in position with the rim $d$. At this time, one of the plates $g$ may be in position. This plate may conveniently be made of one piece. After the rim $d$ and cushions $c$ are in place, the other plate $f$ may be bolted in position. If the tire $e$ is of one piece, the plate $f$ may also conveniently be of one piece. If the tire is made up of a series of segments $e'$, then it may be found desirable to make the plate of a corresponding number of segments, so that as each tire segment $e'$ is placed in position on the rim $d$, the corresponding securing plate segment may be bolted in position to hold the tire segment in place. It will be noted from Fig. 2 that the plates $f$, $g$ have formed on their inner faces, in proper relation to the tire $e$, flanges $f'$, $g'$ or the like, respectively, which rest within recesses $e^3$ in the tire $e$, which recesses are of equal circumferential length to hold the tire against creeping, and are of greater width than the flanges to permit limited radial movement of the tire while holding it against dislodgment.

In use, it will be evident that resiliency is imparted to the structure both through the tire $e$ and the cushions $c$. Where two cushions are employed, the load of the wheel will be transmitted through these cushions, the rim $d$, and the tire $e$, to the ground. The rim $d$ at this instant may flex inwardly by reason of the relation of the slots $d'$ therein to the screws $i$ and this flexing will be accompanied by a crowding of the cushions $c$ against one another and against the side walls of the depressions $b'$. This action produces a maximum degree of resiliency with that degree of flexibility in parts which will reduce to a minimum the stresses on the wheel. The elements are held in proper relation at all times by the plates $f$, $g$ and the tire $e$ is prevented from creeping by reason of the engagement with the recesses $e^3$ of the flanges $f'$, $g'$ on the plates.

It will be evident from the description that the construction is susceptible of changes in details, particularly as concerns the integrality or sectional character of many of the elements and also as concerns their fixed or removable relationship to one another. Further, the invention is not to be limited to the precise character of the material employed since, for instance, the cushions $c$, which are described as of solid resilient material, such as rubber, might be formed of springs. Such changes as are indicated fall within the scope of the invention, the breadth whereof is indicated more definitely in the accompanying claims.

I claim as my invention:

1. A tire structure comprising a wheel felly provided with transverse depressions, a flexible rim carried on the felly and provided with circumferential slots therein, screws passing through the slots and engaging the felly to permit flexing of the rim, a plurality of cylindrical cushioning members disposed transversely in each of the depressions and crowded between the walls thereof and the flexible rim and a tire carried on the rim.

2. A tire structure comprising a wheel felly provided with transverse depressions, a flexible rim carried on the felly and provided with circumferential slots therein, screws passing through the slots and engaging the felly to permit flexing of the rim, a plurality of cylindrical cushions disposed transversely in each of the depressions and crowded between the walls thereof and the flexible rim, a tire carried on the rim, a circumferential plate secured on one side of the felly and a segmental plate secured on the other side of the felly, said plates being provided with flanges on their inner faces to engage the tire and said plates serving to hold the cushions, the rim and the tire in proper relation to the felly.

This specification signed the 13th day of December, A. D. 1919.

CONSTANTINE D. MACROPOULOS.